(12) United States Patent
Hall

(10) Patent No.: US 7,553,414 B2
(45) Date of Patent: Jun. 30, 2009

(54) MAGNETIC FILTER DEVICE

(75) Inventor: Harold Hall, Liverpool (GB)

(73) Assignee: Magnom Corporation Limited (GB)

( * ) Notice: Subject to any disclaimer, the term of this patent is extended or adjusted under 35 U.S.C. 154(b) by 0 days.

(21) Appl. No.: 11/822,281

(22) Filed: Jul. 3, 2007

(65) Prior Publication Data

US 2008/0067130 A1 Mar. 20, 2008

Related U.S. Application Data

(63) Continuation of application No. 09/011,160, filed as application No. PCT/GB96/01773 on Jul. 24, 1996, now abandoned.

(30) Foreign Application Priority Data

Jul. 26, 1995 (GB) ................. 9515352.4

(51) Int. Cl.
*B01D 35/06* (2006.01)
(52) U.S. Cl. .................. 210/222; 210/223; 209/223.2; 209/232
(58) Field of Classification Search ......... 210/222–223; 209/223.2, 232, 223.1
See application file for complete search history.

(56) References Cited

U.S. PATENT DOCUMENTS

| 2,149,764 | A | 3/1939 | Frei |
| 4,208,277 | A | 6/1980 | Lofthouse et al. |
| 4,784,762 | A | 11/1988 | Taliaferro |
| 5,089,128 | A | 2/1992 | Garaschenko et al. |
| 5,389,252 | A | 2/1995 | Morrick |
| 6,743,365 | B1 | 6/2004 | Marlowe |

FOREIGN PATENT DOCUMENTS

| DE | 90 01 431 U | 5/1990 |
| EP | 0 374 251 | 6/1990 |
| FR | 1114135 | 4/1956 |
| GB | 684052 | 12/1952 |
| WO | WO 97/04873 | 2/1997 |

*Primary Examiner*—Terry K Cecil
(74) *Attorney, Agent, or Firm*—K&L Gates LLP

(57) ABSTRACT

A magnetic filter device for filtering ferromagnetic material from a fluid in which the material is suspended has a pair of annular plates (5, 6) attached to either side of an annular magnet (2) of smaller diameter. Pairs of pole pieces (11, 12) radially disposed on the plates (5, 6) are aligned so as to generate fields of magnetic flux which promote the collection and retention of ferromagnetic material between the pairs of pole pieces (11, 12).

128 Claims, 3 Drawing Sheets

MAGNETIC FILTER DEVICE

This application is a continuation of U.S. patent application Ser. No. 09/011,160, now abandoned, which is the National Stage of International Application No. PCT/GB96/01773, filed on Jul. 24, 1996, and which U.S. patent application is incorporated herein by reference.

The present invention relates to a magnetic filter device for filtering ferromagnetic material from a fluid in which said material is suspended.

Fluid such as engine oil which circulates in an engine and/or gearbox, and hydraulic fluid which circulates in hydraulic systems, tends to accumulate ferrous material from metallic surfaces which are lubricated by the fluid. Such particulate material in suspension is liable to accelerate wear of these surfaces and thereby generate even more ferrous matter.

Conventional filters fail to filter out a substantial amount of ferrous material from the fluid, which material, is liable to cause damage to an engine and/or gearbox or hydraulic system. In addition, as there is no indication of the quantity of ferrous material in the fluid, the fluid conventionally, is changed after the engine or hydraulic system has been run for a certain period of time, in order to limit possible damage.

A magnetic filter device for filtering ferromagnetic material from a fluid in which said material is suspended, has an inlet means and an outlet means which are isolated from each other within the device. A pair of annular plates are attached to either side of an annular magnet of smaller diameter, which sides are of opposing magnetic polarity to thus generate a magnetic field between the pair of plates. Each plate is recessed to form radially extending pole pieces. The plates are oriented with respect to each other so that the pole pieces and recesses are axially aligned. The magnetic flux distributions thus created, divert ferromagnetic material in the fluid towards the regions defined by opposite pairs of pole pieces.

In use, the magnetic filter device can be inserted between a containing means or engine, and a conventional filter or pump, so as to enhance the collection of ferromagnetic material from the circulating fluid.

In accordance with one aspect of the present invention, a magnetic filter device for filtering ferromagnetic material from a fluid in which said material is suspended, comprises a magnet and a pair of metal plates, said magnet having faces of opposite magnetic polarity, said plates being disposed in abutment with said faces respectively, each plate having a plurality of recesses about an outer perimeter of the plate to form radially extending magnetic pole pieces, which extend beyond an outer perimeter of the magnet faces, said plates being oriented so that the recesses and pole pieces on one plate are axially aligned with those recesses and pole pieces on the other plate, wherein axially opposite recesses define passage means for said fluid and also regions from which ferromagnetic material is repelled, and wherein said pole pieces define regions to which ferromagnetic material is attracted and retained.

Preferably, the magnetic filter device is further provided with a distribution plate having a plurality of apertures which are axially alignable with said recesses, said apertures being the only passage means of fluid to said metal plates.

It is further preferred that the distribution plate, the magnet and said metal plates are each provided with a central hole which is adapted to receive a tube through which fluid can pass, said tube providing means for isolating, within the device, fluid passage in the tube from fluid flow through the recesses.

Advantageously, each recess and an outer edge of each pole piece is further provided with one or a plurality of slots.

Preferably, the outer edges of axially facing pole pieces are curved towards one another.

It is preferred that means are provided for ensuring that said recesses and said apertures are maintained in axial alignment.

The distribution plate is advantageously made of a non-ferromagnetic material. This would discourage any collection of ferromagnetic material thereon.

The magnet is advantageously made of a material which will generate a magnetic field between the metal plates which is strong enough to attract ferromagnetic material from fluid passing therebetween.

The metal plate which is impinged first by fluid flow through the device, is advantageously thicker than the other metal plate through which fluid leaves the device.

Preferably, an outer face of the tube is provided with a recess which can receive retaining means which is able to keep the distribution plate in abutment with the axially closer of said metal plates.

Advantageously, a housing is further provided, which is adapted at one end to be received by a containing means of said fluid, said containing means having an input means and an output means, the housing being adapted at the other end to receive a filter of known type, an output of which known filter is continuous with the tube in the magnetic filter device and also the input means to the containing means, said output means from the containing means being continuous with the apertures in the distribution plate and the recesses in the metal plates.

In a further embodiment, the magnetic filter device is provided with two distribution plates disposed either side of each of the metal plates, each distribution plate having a plurality of apertures which are axially alignable with said recesses, said apertures being the only passage means of fluid to said metal plates, the apertures in both distribution plates providing inlet and outlet means for bi-directional axial flow of fluid.

In accordance with a further aspect of the present invention, there is provided a magnetic filter device for filtering ferromagnetic material from a fluid in which said material is suspended, which comprises a known filter, a magnet and a pair of metal plates, said magnet having faces of opposite magnetic polarity, said plates being disposed in abutment with said faces respectively, each plate having a plurality of recesses about an outer perimeter of the plate to form radially extending magnetic pole pieces, which extend beyond an outer perimeter of the magnet faces, said plates being oriented so that the recesses and pole pieces on one plate are axially aligned with those recesses and pole pieces on the other plate, wherein axially opposite recesses define passage means for said fluid and also regions from which ferromagnetic material is repelled, and wherein said pole pieces define regions to which ferromagnetic material is attracted and retained, said known filter having passage means for said fluid which is continuous with fluid passage through said recesses.

A specific embodiment of the present invention will now be described with reference to the accompanying drawings, in which.

Figure 1:
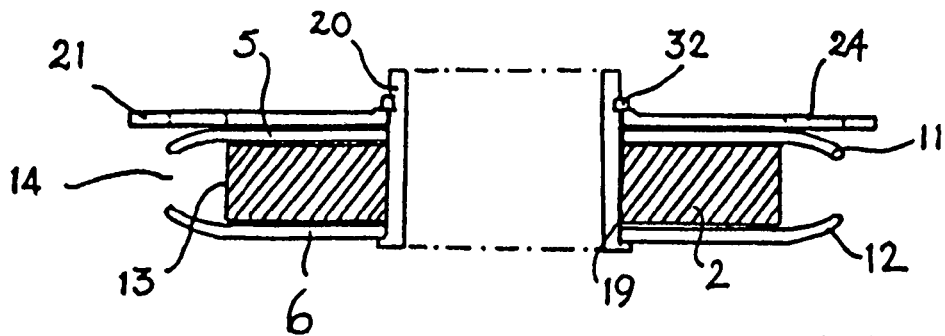
FIG. 1 is a cross-section through a magnetic filter device in accordance with one aspect of the present invention.
Figure 4:
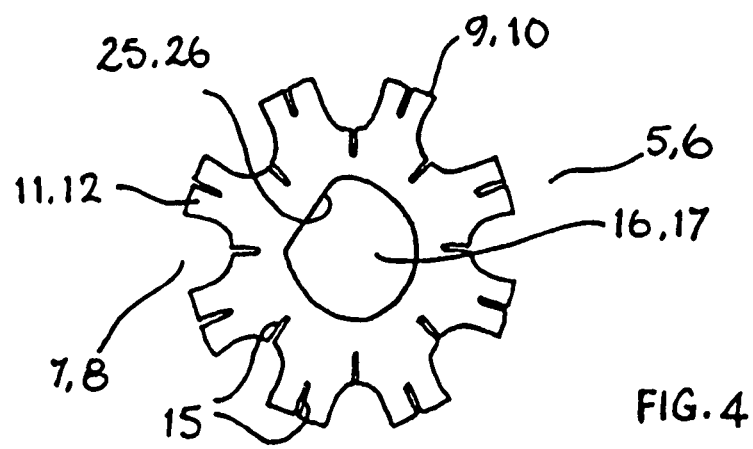
FIG. 4 is a top view of one of the metal plates in the device.
Figure 2:
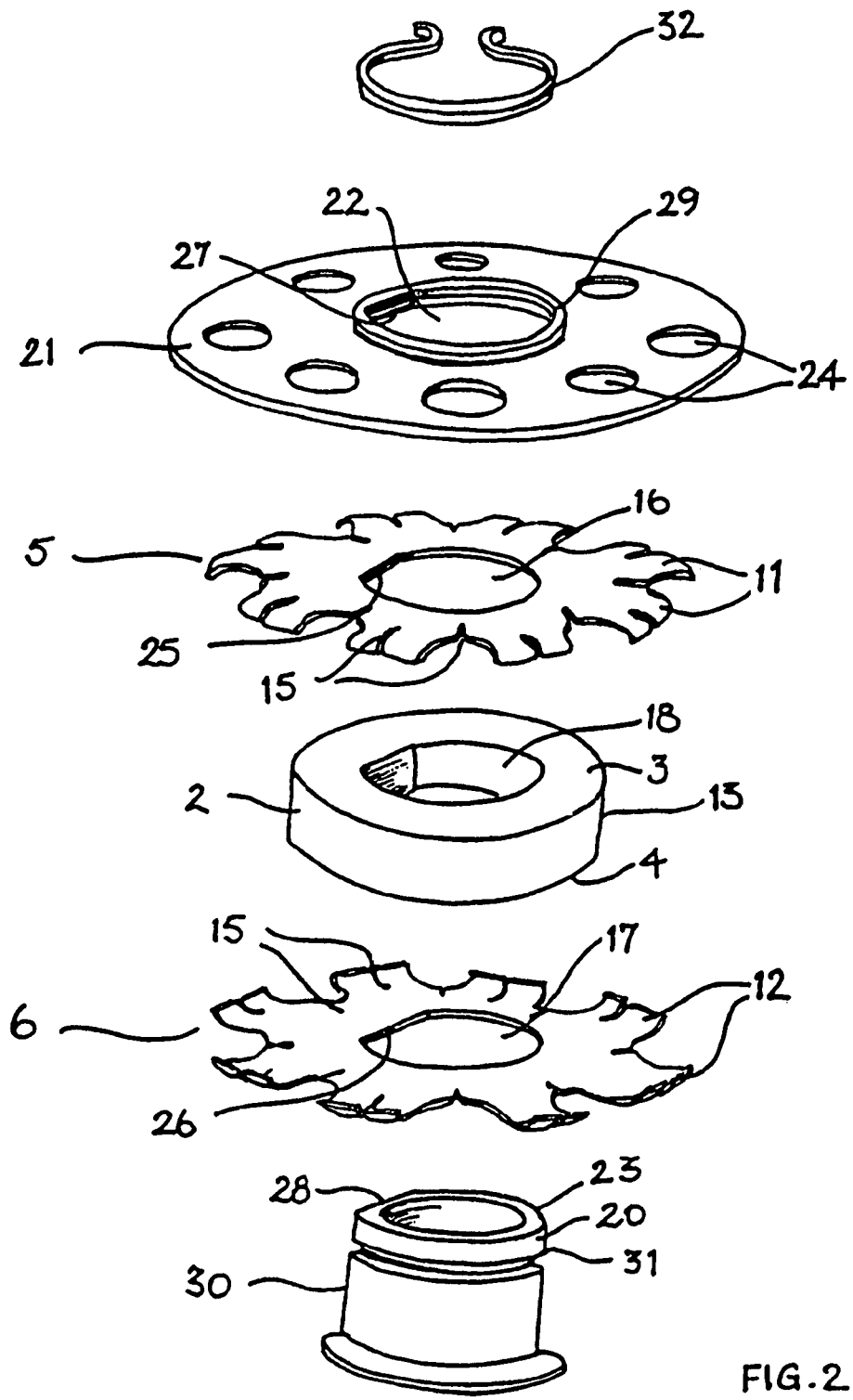
FIG. 2 is an exploded perspective view of the device in FIG. 1.

A magnetic filter device 1, as shown in FIGS. 1 & 2, for filtering ferromagnetic material (not shown) from a fluid (not shown) in which said material is suspended, comprises a magnet 2 having two faces 3, 4 of opposite magnetic polarity, against which faces 3, 4, abut metal plates 5, 6, respectively. The plates 5, 6 are provided with a plurality of recesses 7, 8 respectively, in outer circumferential edges 9, 10 of said plates 5, 6 so as to form pole pieces 11, 12 as shown in FIGS. 2 and 4. Equal numbers of such pole pieces, 11, 12 are formed in each plate 5, 6, and the latter oriented so that the pole pieces 11 and recesses 7 of the plate 5, are axially aligned with the respective pole pieces 12 and recesses 8 of the plate 6. Axially displaced pairs of pole pieces 11, 12 have opposite magnetic polarity by virtue of their respective locations on the faces 3, 4 of the magnet 2. They overlap an outer edge 13 of the magnet 2 to define radially extending collecting regions 14 in which ferromagnetic particles subject to the magnetic fields generated therein, can be retained. The ends of each pair of pole pieces 11, 12 are curved towards each other to further enhance the strength and distribution of the magnetic fields. Furthermore, because each recess 7, 8 is flanked radially by portions of metal of like polarity, ferromagnetic material is repelled towards the collecting regions 14 and also away from the path of fluid flow.

Each pole piece 11, 12 and each recess 7, 8 is further provided with a slot 15. Each slot 15 defines adjacent regions of like polarity in which a strongly repelling magnetic field is thus generated. Such fields further promote the retention of ferromagnetic material to the regions 14 between facing pole pieces.

Apertures 16, 17 centrally disposed in plates 5, 6 axially align with a central aperture 18 in the magnet 2 to form a channel 19 in the device 1, in which a central tube 20 is disposed. The tube 20 extends beyond the collective thicknesses of the plates 5, 6 and the magnet 2.

Figure 3:
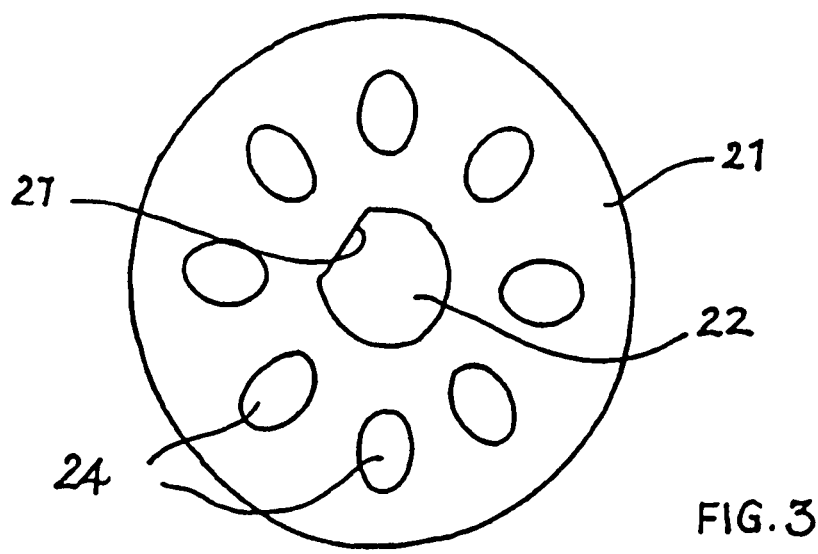
FIG. 3 is a top view of the distribution plate in FIGS. 1 & 2.

A distribution plate 21, as shown in FIG. 3, has a central aperture 22 which enables the distribution plate 21 to be threaded over an end 23 of the central tube 20, so as to be disposed adjacent to the metal plate 5. The plate 21 is further provided with apertures 24 equal in number to the recesses 7, 8 in each of the plates 5, 6. The distribution plate 21 is disposed about the tube 20 so that the apertures 24 are axially aligned with the recesses 7, 8 in the metal plates 5, 6. The plates 5, 6 are each provided with flats 25, 26 in the apertures 16, 17 respectively, and the aperture 22 of the distribution plate 21 is also provided with a flat 27 of similar size. In the orientation described above where the apertures 24 and the recesses 7, 8 are in axial alignment, the flats 25, 26 and 27 are also axially aligned. The tube 20 is provided with a flattened region 28 on an outer face 30 against which the flats 25, 26 and 27 of the plates 5, 6 and 21 are disposed in order to maintain the above-mentioned orientation when the magnetic filter device 1 is assembled.

The distribution plate 21 has a flange portion 29 about the central aperture 22. The outer face 30 of the central tube 20 is further provided with an annular recess 31 which is adapted to receive a circlip 32 which abuts the flange portion 29 when the distribution plate 21 is in abutment with the metal plate 5.

The distribution plate 21 may be circumferentially sealed against a housing (not shown) to ensure that only fluid which flows through apertures 24 in the distribution plate 21 passes through to the recesses 7, 8.

Figure 5:
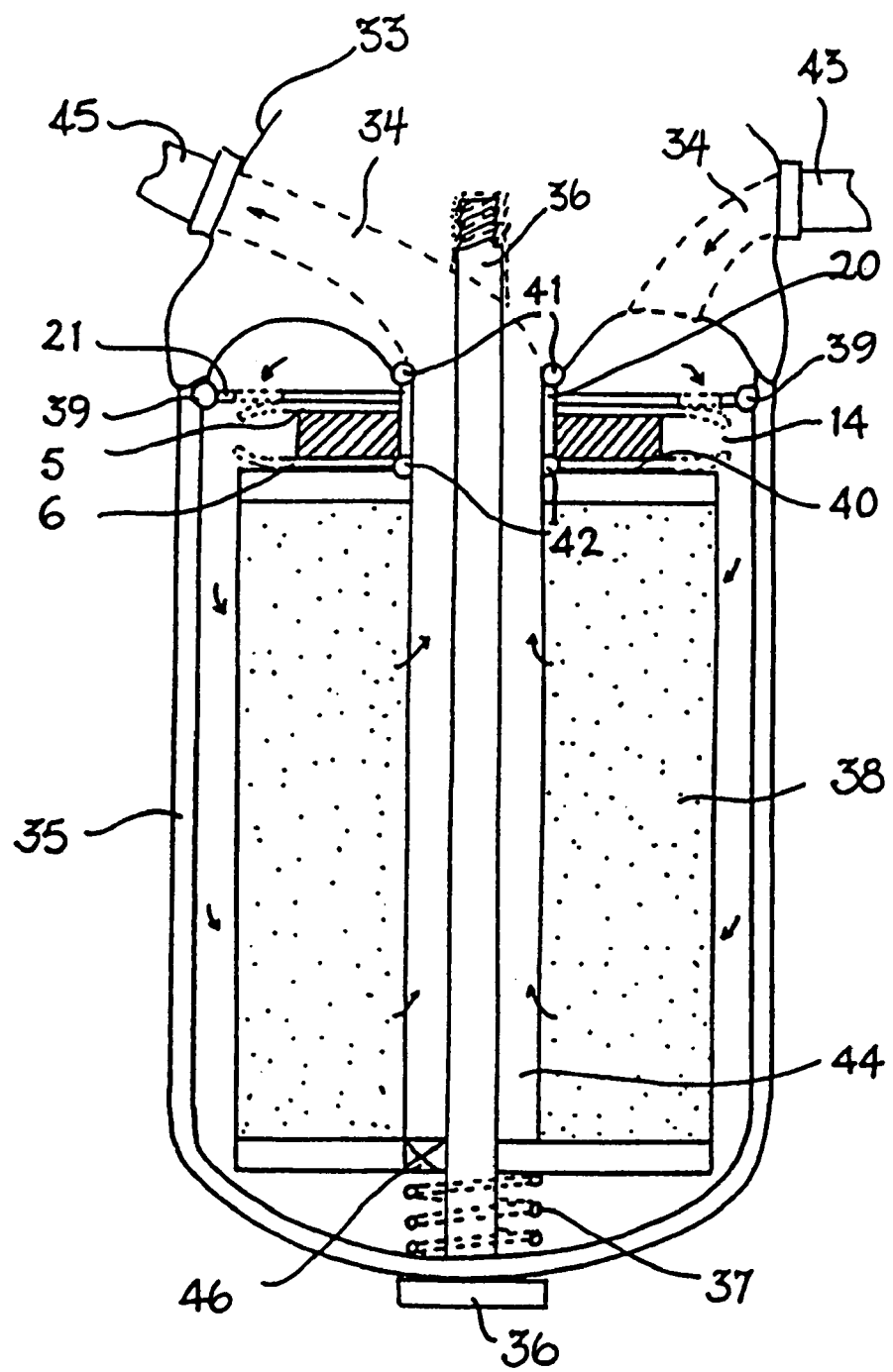
FIG. 5 is a schematic diagram illustrating one application of the device in FIGS. 1 to 4.

In one example of an application of the magnetic filter device 1, the latter is removeably disposed between a known containing means 33 for fluid 34 to be filtered in a system in use (not shown), and a known filter unit 35, as shown in FIG. 5.

The known filter unit 35 is attachable to the containing means 33 by means of a bolt 36 which enters a lower face of the filter unit 35, passes through its centre, continues out through an upper portion of the unit 35 and screws into a part of the containing means 33. A spring 37 provided between a block of filter material 38 and a base of the filter unit 35 is further compressed to accommodate the insertion of the magnetic filter device 1 between the containing means 33 and the filter unit 35.

The distribution plate 21 is sealed against the filter unit 35 by annular sealing means 39. The central tube 20 is sealed against the containing means 33 and a surface 40 of the known filter unit 35 by sealing means 41 and 42 respectively.

Fluid 34 exits the containing means 33 through an outlet port 43. It flows towards the distribution plate 21 and thus through axially coincident apertures 24 and recesses 7, 8 in the distribution plate 21 and the plates 5, 6 respectively. From the magnetic filter device 1, fluid enters the known filter unit 35 and flows to the filter material 38, in which other particles in suspension can be retained. Fluid exits the filter material 38 and flows through a central passage 44 which is continuous with the central tube 20 of the magnetic filter device 1. From the central tube 20 of the device 1, fluid re-enters the containing means 33 through an input port 45. It is then recirculated around the system in use before its return to the outlet port 43. More ferromagnetic material is retained with the increased frequency of circulation of fluid through the magnetic filter device 1.

In the event of blockage of the filter material 38, a pressure relief valve 46 allows fluid to bypass the filter material 38 and proceed through to the central passage 44.

Material retained in the filter material 38 up to this point may then be disadvantageously washed back into the circulation. However, since fluid input into the magnetic filter device 1 is isolated from fluid output, any particles collected in the magnetic filter device 1 will be retained in such an event.

In such an arrangement, the magnetic filter device 1, can act as a convenient check point for the amount of wear on engine and/or gearbox components or hydraulic system, and therefore enhance their safety and efficiency.

In a further embodiment, the magnetic filter device can be oriented with respect to a known filter unit so as to have the distribution plate 21 facing the direction of fluid flow.

In a further embodiment, the filter device can be an integral member of a known filter unit.

The invention claimed is:

1. A device for filtering ferromagnetic material from a fluid in which said material is suspended, comprising a magnet and a pair of metal plates, said magnet having faces of opposite magnetic polarity, each of said plates being disposed in abutment with a respective one of said magnet faces, each of said plates comprising a plurality of recesses about an outer perimeter of the plate to form radially extending magnetic pole pieces, which extend beyond an outer perimeter of said magnet faces, said plates being oriented so that said recesses and pole pieces on a first one of said plates are aligned with said recesses and pole pieces on the second of said plates, a plurality of passage means for said fluid, each extending between respective opposed recesses on said first and second plates and a plurality of regions of magnetic attraction to which ferromagnetic material is attracted and retained, said regions of magnetic attraction being spaced apart around the periphery of the plates, each said region of magnetic attraction extending between opposed said pole pieces and adjacent regions of magnetic attraction being separated by one of said plurality of passage means, wherein each of said recesses is further provided with one or a plurality of slots.

2. A device for filtering ferromagnetic material from a fluid in which said material is suspended, comprising a magnet and a pair of metal plates, said magnet having faces of opposite magnetic polarity, each of said plates being disposed in abutment with a respective one of said magnet faces, each of said plates comprising a plurality of recesses about an outer perimeter of the plate to form radially extending magnetic pole pieces, which extend beyond an outer perimeter of said magnet faces, said plates being oriented so that said recesses and pole pieces on a first one of said plates are aligned with said recesses and pole pieces on the second of said plates, a plurality of passage means for said fluid, each extending between respective opposed recesses on said first and second plates and a plurality of regions of magnetic attraction to which ferromagnetic material is attracted and retained, said regions of magnetic attraction being spaced apart around the periphery of the plates, each said region of magnetic attraction extending between opposed said pole pieces and adjacent regions of magnetic attraction being separated by one of said plurality of passage means, wherein the outer edges of said facing pole pieces are curved towards one another.

3. A device for filtering ferromagnetic material from a fluid in which said material is suspended, comprises a magnet and a pair of metal plates, said magnet having faces of opposite magnetic polarity, said plates being disposed in abutment with said faces respectively, each plate having a plurality of recesses about an outer perimeter of each plate to form radially extending magnetic pole pieces, which extend beyond an outer perimeter of the magnet faces, said plates being oriented so that the recesses and pole pieces on one plate are axially aligned with those recesses and pole pieces on the other plate, a plurality of passage means for said fluid, each extending between respective opposed recesses on said first and second plates, a plurality of regions of magnetic attraction to which ferromagnetic material is attracted and retained, said regions of magnetic attraction being spaced apart around the periphery of the plates, each said region of magnetic attraction extending between opposed said pole pieces and adjacent regions of magnetic attraction being separated by one of said plurality of passage means, and a plurality of regions of magnetic repulsion, each located between two adjacent said regions of magnetic attraction, from which ferromagnetic material is repelled towards an adjacent region of magnetic attraction, said device being further provided with a distribution plate having a plurality of apertures which are axially alignable with said recesses, said apertures being the only passage means of fluid to said metal plates, wherein the distribution plate, the magnet and said metal plates are each provided with an aperture which is adapted to receive a tube through which fluid can pass, said tube providing means for isolating, within the device, fluid passage in the tube from fluid flow through the recesses, and wherein each recess and an outer edge of each pole piece is further provided with one or a plurality of slots.

4. A device for filtering ferromagnetic material from a fluid in which said material is suspended, comprising a magnet and a pair of metal plates, said magnet having faces of opposite magnetic polarity, each of said plates being disposed in abutment with a respective one of said magnet faces, each of said plates comprising a plurality of recesses about an outer perimeter of the plate to form radially extending magnetic pole pieces, which extend beyond an outer perimeter of said magnet faces, said plates being oriented so that said recesses and pole pieces on a first one of said plates are aligned with said recesses and pole pieces on the second of said plates, wherein opposed recesses on said first and second plates define passage means for said fluid and wherein opposed said pole pieces on said first and second plates are positioned with respect to each other to define a plurality of collecting regions extending between opposed pole pieces to which ferromagnetic material is attracted and retained, wherein each of said recesses is further provided with one or a plurality of slots.

5. A device for filtering ferromagnetic material from a fluid in which said material is suspended, comprising a magnet and a pair of metal plates, said magnet having faces of opposite magnetic polarity, each of said plates being disposed in abutment with a respective one of said magnet faces, each of said plates comprising a plurality of recesses about an outer perimeter of the plate to form radially extending magnetic pole pieces, which extend beyond an outer perimeter of said magnet faces, said plates being oriented so that said recesses and pole pieces on a first one of said plates are aligned with said recesses and pole pieces on the second of said plates, wherein opposed recesses on said first and second plates define passage means for said fluid and wherein opposed said pole pieces on said first and second plates are positioned with respect to each other to define a plurality of collecting regions extending between opposed pole pieces to which ferromagnetic material is attracted and retained, where the outer edges of said facing pole pieces are curved towards one another.

6. A device for filtering ferromagnetic material from a fluid, the device comprising:
   a magnet having a first face and a second face, the first face having a first polarity and the second face having a second polarity;
   a first plate disposed in abutment with the first face, the first plate including:
      a first recess radially displaced from the magnet;
      a second recess radially displaced from the magnet;
      a first pole piece extending radially from the magnet, wherein the first pole piece is between the first recess and the second recess; and
      a second pole piece extending radially from the magnet, wherein the second recess is between the first pole piece and the second pole piece;
   a second plate disposed in abutment with the second face, the second plate including:
      a third recess radially displaced from the magnet and axially aligned with the first recess;
      a fourth recess radially displaced from the magnet and axially aligned with the second recess;
      a third pole piece extending radially from the magnet and axially aligned with the first pole piece, wherein the third pole piece is between the third recess and the fourth recess; and
      a fourth pole piece extending radially from the magnet and axially aligned with the second pole piece, wherein the fourth recess is between the third pole piece and the fourth pole piece;
   a first passage defined by the first recess and the third recess, wherein the first passage is usable with at least one fluid guide for guiding the fluid to flow substantially axially through the first passage and causing an insubstantial radial fluid flow from the first passage;
   a second passage defined by the second recess and the fourth recess, wherein the first passage is usable with the at least one fluid guide for guiding the fluid to flow substantially axially through the second passage and causing an insubstantial radial fluid flow from the second passage;
   a first collection region defined by the first pole piece and the third pole piece, the first collection region adapted to attract and retain ferromagnetic material from at least one of the first passage and the second passage; and
a second collection region defined by the second pole piece and the fourth pole piece, the second collection region adapted to attract and retain ferromagnetic material from at least one of the first passage and the second passage, wherein a first edge of the first recess includes a first slot and a second edge of the third recess includes a second slot.

7. The device of claim 6, wherein a third edge of the first pole piece includes a third slot and a fourth edge of the third pole piece includes a fourth slot, wherein the first slot, the second slot, the third slot, and the fourth slot are radially oriented.

8. The device of claim 7, wherein the third edge of the first pole piece is curved towards the fourth edge of the third pole piece and the fourth edge of the third pole piece is curved towards the third edge of the first pole piece.

9. The device of claim 6, wherein the first recess and the third recess define a region from which the ferromagnetic material is repelled.

10. The device of claim 6, wherein the magnet, the first plate, and the second plate are each provided with a central hole which is adapted to receive a tube through which the fluid can pass, the tube isolating the fluid flowing through the tube from the fluid flowing through the first passage and the second passage.

11. The device of claim 6, further comprising a distribution plate having a first aperture alignable with the first recess and a second aperture alignable with the second recess.

12. The device of claim 11, wherein substantially all the fluid flows through a plurality of apertures of the distribution plate including at least the first aperture and the second aperture, and through a plurality of recesses of the first plate including at least the first recess and the second recess.

13. The device of claim 11, wherein the distribution plate is made of a non-ferromagnetic material.

14. The device of claim 6, wherein the magnet is a ring magnet.

15. The device of claim 6, wherein the at least one fluid guide is a housing.

16. The device of claim 6, further comprising a housing, wherein the housing guides the fluid to flow substantially axially through the first passage and the second passage and causes an insubstantial radial fluid flow from the first passage and the second passage.

17. The device of claim 16, wherein an end of the housing is adapted for receipt by a fluid container, the fluid container having an input and an output.

18. The device of claim 6, wherein the first plate is thicker than the second plate.

19. The device of claim 6, wherein the magnet comprises a material that generates a magnetic field between the first plate and the second plate of sufficient strength to attract and retain substantially all of the ferromagnetic material in the fluid passing through the device.

20. The device of claim 6, wherein the first plate and the second plate are releasably fixed to the magnet.

21. The device of claim 6, wherein the first plate and the second plate are substantially comprised of a ferrous metal.

22. A device for filtering ferromagnetic material from a fluid, the device comprising:
a magnet having a first face and a second face, the first face having a first polarity and the second face having a second polarity;
a first plate disposed in abutment with the first face, the first plate including:

a first recess radially displaced from the magnet;
a second recess radially displaced from the magnet;
a first pole piece extending radially from the magnet, wherein the first pole piece is between the first recess and the second recess; and
a second pole piece extending radially from the magnet, wherein the second recess is between the first pole piece and the second pole piece;
a second plate disposed in abutment with the second face, the second plate including:
a third recess radially displaced from the magnet and axially aligned with the first recess;
a fourth recess radially displaced from the magnet and axially aligned with the second recess;
a third pole piece extending radially from the magnet and axially aligned with the first pole piece, wherein the third pole piece is between the third recess and the fourth recess; and
a fourth pole piece extending radially from the magnet and axially aligned with the second pole piece, wherein the fourth recess is between the third pole piece and the fourth pole piece;
a first passage defined by the first recess and the third recess, wherein the first passage is usable with at least one fluid guide for guiding the fluid to flow substantially axially through the first passage and causing an insubstantial radial fluid flow from the first passage;
a second passage defined by the second recess and the fourth recess, wherein the first passage is usable with the at least one fluid guide for guiding the fluid to flow substantially axially through the second passage and causing an insubstantial radial fluid flow from the second passage;
a first collection region defined by the first pole piece and the third pole piece, the first collection region adapted to attract and retain ferromagnetic material from at least one of the first passage and the second passage; and
a second collection region defined by the second pole piece and the fourth pole piece, the second collection region adapted to attract and retain ferromagnetic material from at least one of the first passage and the second passage, wherein a first edge of the first pole piece includes a first slot and a second edge of the third pole piece includes a second slot.

23. The device of claim 22, wherein the first recess and the third recess define a region from which the ferromagnetic material is repelled.

24. The device of claim 22, wherein the magnet, the first plate, and the second plate are each provided with a central hole which is adapted to receive a tube through which the fluid can pass, the tube isolating the fluid flowing through the tube from the fluid flowing through the first passage and the second passage.

25. The device of claim 22, further comprising a distribution plate having a first aperture alignable with the first recess and a second aperture alignable with the second recess.

26. The device of claim 25, wherein substantially all the fluid flows through a plurality of apertures of the distribution plate including at least the first aperture and the second aperture, and through a plurality of recesses of the first plate including at least the first recess and the second recess.

27. The device of claim 25, wherein the distribution plate is made of a non-ferromagnetic material.

28. The device of claim 22, wherein the magnet is a ring magnet.

29. The device of claim 22, wherein the at least one fluid guide is a housing.

30. The device of claim 22, further comprising a housing, wherein the housing guides the fluid to flow substantially axially through the first passage and the second passage and causes an insubstantial radial fluid flow from the first passage and the second passage.

31. The device of claim 30, wherein an end of the housing is adapted for receipt by a fluid container, the fluid container having an input and an output.

32. The device of claim 22, wherein the first plate is thicker than the second plate.

33. The device of claim 22, wherein the magnet comprises a material that generates a magnetic field between the first plate and the second plate of sufficient strength to attract and retain substantially all of the ferromagnetic material in the fluid passing through the device.

34. The device of claim 22, wherein the first plate and the second plate are releasably fixed to the magnet.

35. The device of claim 22, wherein the first plate and the second plate are substantially comprised of a ferrous metal.

36. A device for filtering ferromagnetic material from a fluid, the device comprising:
    a magnet having a first face and a second face, the first face having a first polarity and the second face having a second polarity;
    a first plate disposed in abutment with the first face, the first plate including:
        a first recess radially displaced from the magnet;
        a second recess radially displaced from the magnet;
        a first pole piece extending radially from the magnet, wherein the first pole piece is between the first recess and the second recess; and
        a second pole piece extending radially from the magnet, wherein the second recess is between the first pole piece and the second pole piece;
    a second plate disposed in abutment with the second face, the second plate including:
        a third recess radially displaced from the magnet and axially aligned with the first recess;
        a fourth recess radially displaced from the magnet and axially aligned with the second recess;
        a third pole piece extending radially from the magnet and axially aligned with the first pole piece, wherein the third pole piece is between the third recess and the fourth recess; and
        a fourth pole piece extending radially from the magnet and axially aligned with the second pole piece, wherein the fourth recess is between the third pole piece and the fourth pole piece;
    a first passage defined by the first recess and the third recess, wherein the first passage is usable with at least one fluid guide for guiding the fluid to flow substantially axially through the first passage and causing an insubstantial radial fluid flow from the first passage;
    a second passage defined by the second recess and the fourth recess, wherein the first passage is usable with the at least one fluid guide for guiding the fluid to flow substantially axially through the second passage and causing an insubstantial radial fluid flow from the second passage;
    a first collection region defined by the first pole piece and the third pole piece, the first collection region adapted to attract and retain ferromagnetic material from at least one of the first passage and the second passage; and
    a second collection region defined by the second pole piece and the fourth pole piece, the second collection region adapted to attract and retain ferromagnetic material from at least one of the first passage and the second passage,
    wherein a first edge of the first pole piece is curved towards a second edge of the third pole piece.

37. The device of claim 36, wherein the second edge of the third pole piece is curved towards the first edge of the first pole piece.

38. The device of claim 36, wherein the first recess and the third recess define a region from which the ferromagnetic material is repelled.

39. The device of claim 36, wherein the magnet, the first plate, and the second plate are each provided with a central hole which is adapted to receive a tube through which the fluid can pass, the tube isolating the fluid flowing through the tube from the fluid flowing through the first passage and the second passage.

40. The device of claim 36, further comprising a distribution plate having a first aperture alignable with the first recess and a second aperture alignable with the second recess.

41. The device of claim 40, wherein substantially all the fluid flows through a plurality of apertures of the distribution plate including at least the first aperture and the second aperture, and through a plurality of recesses of the first plate including at least the first recess and the second recess.

42. The device of claim 40, wherein the distribution plate is made of a non-ferromagnetic material.

43. The device of claim 36, wherein the magnet is a ring magnet.

44. The device of claim 36, wherein the at least one fluid guide is a housing.

45. The device of claim 36, further comprising a housing, wherein the housing guides the fluid to flow substantially axially through the first passage and the second passage and causes an insubstantial radial fluid flow from the first passage and the second passage.

46. The device of claim 45, wherein an end of the housing is adapted for receipt by a fluid container, the fluid container having an input and an output.

47. The device of claim 36, wherein the first plate is thicker than the second plate.

48. The device of claim 36, wherein the magnet comprises a material that generates a magnetic field between the first plate and the second plate of sufficient strength to attract and retain substantially all of the ferromagnetic material in the fluid passing through the device.

49. The device of claim 36, wherein the first plate and the second plate are releasably fixed to the magnet.

50. The device of claim 36, wherein the first plate and the second plate are substantially comprised of a ferrous metal.

51. A device for filtering ferromagnetic material from a fluid, the device comprising:
    a magnet having a first face and a second face, the first face having a first polarity and the second face having a second polarity;
    a first pole piece disposed in abutment with the first face, extending radially from the magnet;
    a second pole piece disposed in abutment with the first face, extending radially from the magnet;
    a first recess radially displaced from the magnet, wherein the first recess is defined by the first pole piece and the second pole piece;
    a third pole piece disposed in abutment with the second face, extending radially from the magnet and axially aligned with the first pole piece;
    a fourth pole piece disposed in abutment with the second face, extending radially from the magnet and axially aligned with the second pole piece;

a second recess radially displaced from the magnet, wherein the second recess is defined by the third pole piece and the fourth pole piece and is axially aligned with first recess;

a passage defined by the first recess and the second recess, wherein the passage is usable with a fluid guide for guiding the fluid to flow substantially axially through the passage and causing an insubstantial radial fluid flow from the passage;

a first collection region defined by the first pole piece and the third pole piece, the first collection region adapted to attract and retain ferromagnetic material from the passage; and a second collection region defined by the second pole piece and the fourth pole piece, the second collection region adapted to attract and retain ferromagnetic material from the passage, wherein a first edge of the first recess includes a first slot and a second edge of the second recess includes a second slot.

52. The device of claim 51, wherein a third edge of the first pole piece includes a third slot and a fourth edge of the third pole piece includes a fourth slot, wherein the first slot, the second slot, the third slot, and the fourth slot are radially oriented.

53. The device of claim 52, wherein the third edge of the first pole piece is curved towards the fourth edge of the third pole piece and the fourth edge of the third pole piece is curved towards the third edge of the first pole piece.

54. The device of claim 51, wherein the first recess defines a region from which the ferromagnetic material is repelled.

55. The device of claim 51, wherein the magnet is provided with a central hole which is adapted to receive a tube through which the fluid can pass, the tube isolating the fluid flowing through the tube from the fluid flowing through the passage.

56. The device of claim 51, further comprising a distribution plate having a plurality of apertures including a first aperture alignable with the first recess.

57. The device of claim 56, wherein substantially all the fluid flows through the plurality of apertures of the distribution plate including at least the first aperture, and through at least the first recess.

58. The device of claim 56, wherein the distribution plate is made of a non-ferromagnetic material.

59. The device of claim 51, wherein the magnet is a ring magnet.

60. The device of claim 51, wherein the fluid guide is a housing.

61. The device of claim 51, further comprising a housing, wherein the housing guides the fluid to flow substantially axially through the passage and causes an insubstantial radial fluid flow from the passage.

62. The device of claim 61, wherein an end of the housing is adapted for receipt by a fluid container, the fluid container having an input and an output.

63. The device of claim 51, wherein the first pole piece and second pole piece are thicker than the third pole piece and the fourth pole piece.

64. The device of claim 51, wherein the magnet comprises a material that generates a magnetic field between the first pole piece and the third pole piece, and between the second pole piece and the fourth pole piece, of sufficient strength to attract and retain substantially all of the ferromagnetic material in the fluid passing through the device.

65. The device of claim 51, wherein the first pole piece and the third pole piece are defined by a first plate.

66. The device of claim 65, wherein the second pole piece and the fourth pole piece are defined by a second plate.

67. A device for filtering ferromagnetic material from a fluid, the device comprising:

a magnet having a first face and a second face, the first face having a first polarity and the second face having a second polarity;

a first pole piece disposed in abutment with the first face, extending radially from the magnet;

a second pole piece disposed in abutment with the first face, extending radially from the magnet;

a first recess radially displaced from the magnet, wherein the first recess is defined by the first pole piece and the second pole piece;

a third pole piece disposed in abutment with the second face, extending radially from the magnet and axially aligned with the first pole piece;

a fourth pole piece disposed in abutment with the second face, extending radially from the magnet and axially aligned with the second pole piece;

a second recess radially displaced from the magnet, wherein the second recess is defined by the third pole piece and the fourth pole piece and is axially aligned with first recess;

a passage defined by the first recess and the second recess, wherein the passage is usable with a fluid guide for guiding the fluid to flow substantially axially through the passage and causing an insubstantial radial fluid flow from the passage;

a first collection region defined by the first pole piece and the third pole piece, the first collection region adapted to attract and retain ferromagnetic material from the passage; and a second collection region defined by the second pole piece and the fourth pole piece, the second collection region adapted to attract and retain ferromagnetic material from the passage, wherein a first edge of the first pole piece includes a first slot and a second edge of the third pole piece includes a second slot.

68. The device of claim 67, wherein the first recess defines a region from which the ferromagnetic material is repelled.

69. The device of claim 67, wherein the magnet is provided with a central hole which is adapted to receive a tube through which the fluid can pass, the tube isolating the fluid flowing through the tube from the fluid flowing through the passage.

70. The device of claim 67, further comprising a distribution plate having a plurality of apertures including a first aperture alignable with the first recess.

71. The device of claim 70, wherein substantially all the fluid flows through the plurality of apertures of the distribution plate including at least the first aperture, and through at least the first recess.

72. The device of claim 70, wherein the distribution plate is made of a non-ferromagnetic material.

73. The device of claim 67, wherein the magnet is a ring magnet.

74. The device of claim 67, wherein the fluid guide is a housing.

75. The device of claim 67, further comprising a housing, wherein the housing guides the fluid to flow substantially axially through the passage and causes an insubstantial radial fluid flow from the passage.

76. The device of claim 75, wherein an end of the housing is adapted for receipt by a fluid container, the fluid container having an input and an output.

77. The device of claim 67, wherein the first pole piece and second pole piece are thicker than the third pole piece and the fourth pole piece.

78. The device of claim 67, wherein the magnet comprises a material that generates a magnetic field between the first pole piece and the third pole piece, and between the second pole piece and the fourth pole piece, of sufficient strength to attract and retain substantially all of the ferromagnetic material in the fluid passing through the device.

79. The device of claim 67, wherein the first pole piece and the third pole piece are defined by a first plate.

80. The device of claim 79, wherein the second pole piece and the fourth pole piece are defined by a second plate.

81. A device for filtering ferromagnetic material from a fluid, the device comprising:
   a magnet having a first face and a second face, the first face having a first polarity and the second face having a second polarity;
   a first pole piece disposed in abutment with the first face, extending radially from the magnet;
   a second pole piece disposed in abutment with the first face, extending radially from the magnet;
   a first recess radially displaced from the magnet, wherein the first recess is defined by the first pole piece and the second pole piece;
   a third pole piece disposed in abutment with the second face, extending radially from the magnet and axially aligned with the first pole piece;
   a fourth pole piece disposed in abutment with the second face, extending radially from the magnet and axially aligned with the second pole piece;
   a second recess radially displaced from the magnet, wherein the second recess is defined by the third pole piece and the fourth pole piece and is axially aligned with first recess;
   a passage defined by the first recess and the second recess, wherein the passage is usable with a fluid guide for guiding the fluid to flow substantially axially through the passage and causing an insubstantial radial fluid flow from the passage;
   a first collection region defined by the first pole piece and the third pole piece, the first collection region adapted to attract and retain ferromagnetic material from the passage; and
   a second collection region defined by the second pole piece and the fourth pole piece, the second collection region adapted to attract and retain ferromagnetic material from the passage, wherein a first edge of the first pole piece is curved towards a second edge of the third pole piece.

82. The device of claim 81, wherein the second edge of the third pole piece is curved towards the first edge of the first pole piece.

83. The device of claim 81, wherein the first recess defines a region from which the ferromagnetic material is repelled.

84. The device of claim 81, wherein the magnet is provided with a central hole which is adapted to receive a tube through which the fluid can pass, the tube isolating the fluid flowing through the tube from the fluid flowing through the passage.

85. The device of claim 81, further comprising a distribution plate having a plurality of apertures including a first aperture alignable with the first recess.

86. The device of claim 85, wherein substantially all the fluid flows through the plurality of apertures of the distribution plate including at least the first aperture, and through at least the first recess.

87. The device of claim 85, wherein the distribution plate is made of a non-ferromagnetic material.

88. The device of claim 81, wherein the magnet is a ring magnet.

89. The device of claim 81, wherein the fluid guide is a housing.

90. The device of claim 81, further comprising a housing, wherein the housing guides the fluid to flow substantially axially through the passage and causes an insubstantial radial fluid flow from the passage.

91. The device of claim 90, wherein an end of the housing is adapted for receipt by a fluid container, the fluid container having an input and an output.

92. The device of claim 81, wherein the first pole piece and second pole piece are thicker than the third pole piece and the fourth pole piece.

93. The device of claim 81, wherein the magnet comprises a material that generates a magnetic field between the first pole piece and the third pole piece, and between the second pole piece and the fourth pole piece, of sufficient strength to attract and retain substantially all of the ferromagnetic material in the fluid passing through the device.

94. The device of claim 81, wherein the first pole piece and the third pole piece are defined by a first plate.

95. The device of claim 94, wherein the second pole piece and the fourth pole piece are defined by a second plate.

96. A device for filtering ferromagnetic material from a fluid, the device comprising:
   a magnet having a first face and a second face, the first face having a first polarity and the second face having a second polarity;
   a first pole piece disposed in abutment with the first face, extending radially from the magnet;
   a first recess radially displaced from the magnet, wherein the first recess is defined by the first pole piece;
   a second pole piece disposed in abutment with the second face, extending radially from the magnet and axially aligned with the first pole piece;
   a second recess radially displaced from the magnet, wherein the second recess is defined by the second pole piece and is axially aligned with the first recess;
   a passage defined by the first recess and the second recess, wherein the passage is usable with a fluid guide for guiding the fluid to flow substantially axially through the passage and causing an insubstantial radial fluid flow from the passage; and
   a first collection region defined by the first pole piece and the second pole piece, the first collection region adapted to attract and retain ferromagnetic material from the passage, wherein a first edge of the first pole piece is curved towards a second edge of the second pole piece and the second edge of the second pole piece is curved towards the first edge of the first pole piece.

97. The device of claim 96, further comprising:
   a third pole piece disposed in abutment with the first face, extending radially from the magnet, wherein the first recess is defined by the third pole piece;
   a fourth pole piece disposed in abutment with the second face, extending radially from the magnet and axially aligned with the third pole piece, wherein the second recess is defined by the fourth pole piece; and
   a second collection region defined by the third pole piece and the fourth pole piece, the second collection region adapted to attract and retain ferromagnetic material from the passage.

98. The device of claim 96, wherein the magnet is provided with a central hole which is adapted to receive a tube through which the fluid can pass, the tube isolating the fluid flowing through the tube from the fluid flowing through the passage.

99. The device of claim 96, wherein the magnet is a ring magnet.

100. The device of claim 96, further comprising a housing, wherein the housing guides the fluid to flow substantially axially through the passage and causes an insubstantial radial fluid flow from the passage.

101. The device of claim 100, wherein an end of the housing is adapted for receipt by a fluid container, the fluid container having an input and an output.

102. The device of claim 96, wherein the first pole piece and second pole piece is thicker than the second pole piece.

103. The device of claim 96, wherein the magnet comprises a material that generates a magnetic field between the first pole piece and the second pole piece of sufficient strength to attract and retain substantially all of the ferromagnetic material in the fluid passing through the device.

104. The device of claim 96, wherein the first pole piece is defined by a first plate and the second pole piece is defined by a second plate.

105. A device for filtering ferromagnetic material from a fluid, the device comprising:
- a magnet having a first face and a second face, the first face having a first polarity and the second face having a second polarity;
- a first pole piece disposed in abutment with the first face, extending radially from the magnet, wherein a first periphery is defined by a distal edge of the first pole piece;
- a first recess radially displaced from the magnet, wherein the first recess is defined by the first pole piece;
- a second pole piece disposed in abutment with the second face, extending radially from the magnet and axially aligned with the first pole piece, wherein a second periphery is defined by a distal edge of the second pole piece;
- a second recess radially displaced from the magnet, wherein the second recess is defined by the second pole piece and is axially aligned with the first recess;
- a first passage defined by the first recess and the second recess; and
- a first collection region defined by the first pole piece and the second pole piece, the first collection region adapted to attract and retain ferromagnetic material from the first passage, wherein the first collection region is adapted to retain the majority of the ferromagnetic material between the magnet and the first periphery and the second periphery, wherein a first edge of the first pole piece is curved towards a second edge of the second pole piece and the second edge of the second pole piece is curved towards the first edge of the first pole piece.

106. The device of claim 105, further comprising:
- a third pole piece disposed in abutment with the first face, extending radially from the magnet, wherein the first recess is defined by the third pole piece and the first periphery is defined by a distal edge of the third pole piece;
- a fourth pole piece disposed in abutment with the second face, extending radially from the magnet and axially aligned with the third pole piece, wherein the second recess is defined by the fourth pole piece and the second periphery is defined by a distal edge of the fourth pole piece; and
- a second collection region defined by the third pole piece and the fourth pole piece, the second collection region adapted to attract and retain ferromagnetic material from the first passage, wherein the second collection region is adapted to retain the majority of the ferromagnetic material between the magnet and the first periphery and the second periphery.

107. The device of claim 106, further comprising a second passage defined by a third recess and a fourth recess, the third recess radially displaced from the magnet and defined by at least one of the first pole piece and the third pole piece, the fourth recess radially displaced from the magnet and defined by at least one of the second pole piece and the fourth pole piece, wherein the third recess and the fourth recess are axially aligned.

108. The device of claim 105, wherein the magnet is provided with a central hole which is adapted to receive a tube through which the fluid can pass, the tube isolating the fluid flowing through the tube from the fluid flowing through the first passage.

109. The device of claim 105 wherein the magnet is a ring magnet.

110. The device of claim 105, further comprising a housing, wherein the housing guides the fluid to flow substantially axially through the first passage and causes an insubstantial radial fluid flow from the first passage.

111. The device of claim 110, wherein an end of the housing is adapted for receipt by a fluid container, the fluid container having an input and an output.

112. The device of claim 105, wherein the first pole piece is thicker than the second pole piece.

113. The device of claim 105, wherein the magnet comprises a material that generates a magnetic field between the first pole piece and the second pole piece of sufficient strength to attract and retain substantially all of the ferromagnetic material in the fluid passing through the device.

114. The device of claim 105, wherein the first pole piece is defined by a first plate and the second pole piece is defined by a second plate.

115. The device of claim 114, wherein the first plate and the second plate are releasably fixed to the magnet.

116. The device of claim 114, wherein the first plate and the second plate are substantially comprised of a ferrous metal.

117. A device for filtering ferromagnetic material from a fluid, the device comprising;
- a magnet having a first face and a second face, the first face having a first polarity and the second face having a second polarity;
- a first pole piece disposed in abutment with the first face, extending radially from the magnet;
- a first recess radially displaced from the magnet, wherein the first recess is defined by the first pole piece;
- a second pole piece disposed in abutment with the second face, extending radially from the magnet and axially aligned with the first pole piece;
- a second recess radially displaced from the magnet, wherein the second recess is defined by the second pole piece and is axially aligned with the first recess;
- a first passage defined by the first recess and the second recess; and
- a first collection region defined by the first pole piece and the second pole piece, the first collection region adapted to attract and retain ferromagnetic material from the first passage, wherein a first edge of the first pole piece is curved towards a second edge of the second pole piece and the second edge of the second pole piece is curved towards the first edge of the first pole piece.

118. The device of claim 117, further comprising:
- a third pole piece disposed in abutment with the first face, extending radially from the magnet, wherein the first recess is defined by the third pole piece;
- a fourth pole piece disposed in abutment with the second face, extending radially from the magnet and axially aligned with the third pole piece, wherein the second recess is defined by the fourth pole piece; and a second collection region defined by the third pole piece and the fourth pole piece, the second collection region adapted to attract and retain ferromagnetic material from the first passage, wherein the device does not include a magnetizable screen magnetically engaged with the third pole piece and the fourth pole piece adjacent the second collection region.

119. The device of claim 118, further comprising a second passage defined by a third recess and a fourth recess, the third recess radially displaced from the magnet and defined by at least one of the first pole piece and the third pole piece, the fourth recess radially displaced from the magnet and defined by at least one of the second pole piece and the fourth pole piece, wherein the third recess and the fourth recess are axially aligned.

120. The device of claim 117, wherein the magnet is provided with a central hole which is adapted to receive a tube through which the fluid can pass, the tube isolating the fluid flowing through the tube from the fluid flowing through the first passage.

121. The device of claim 117, wherein the magnet is a ring magnet.

122. The device of claim 117, further comprising a housing, wherein the housing guides the fluid to flow substantially axially through the first passage and causes an insubstantial radial fluid flow from the first passage.

123. The device of claim 122, wherein an end of the housing is adapted for receipt by a fluid container, the fluid container having an input and an output.

124. The device of claim 117, wherein the first pole piece is thicker than the second pole piece.

125. The device of claim 117, wherein the magnet comprises a material that generates a magnetic field between the first pole piece and the second pole piece of sufficient strength to attract and retain substantially all of the ferromagnetic material in the fluid passing through the device.

126. The device of claim 117, wherein the first pole piece is defined by a first plate and the second pole piece is defined by a second plate.

127. The device of claim 126, wherein the first plate and the second plate are releasably fixed to the magnet.

128. The device of claim 126, wherein the first plate and the second plate are substantially comprised of a ferrous metal.

* * * * *